United States Patent [19]

Mohring

[11] Patent Number: 5,299,554
[45] Date of Patent: Apr. 5, 1994

[54] BURNER FOR A MOTOR VEHICLE HEATER

[75] Inventor: Fritz Mohring, Ostfildern, Fed. Rep. of Germany

[73] Assignee: J. Eberspacher, Esslingen, Fed. Rep. of Germany

[21] Appl. No.: 849,440

[22] PCT Filed: Dec. 12, 1990

[86] PCT No.: PCT/DE90/00957
§ 371 Date: May 12, 1992
§ 102(e) Date: May 12, 1992

[87] PCT Pub. No.: WO91/10068
PCT Pub. Date: Jul. 11, 1991

[30] Foreign Application Priority Data

Dec. 22, 1989 [DE] Fed. Rep. of Germany ....... 3942647

[51] Int. Cl.[5] .............................................. F24H 3/02
[52] U.S. Cl. .......................... 126/110 D; 237/12.3 C
[58] Field of Search .............. 392/381, 382, 383, 384, 392/385; 34/97, 98; 126/110 C, 110 D; 237/12.3 C, 2 A; 431/114, 310, 314, 356; 432/222, 223

[56] References Cited

U.S. PATENT DOCUMENTS 1,601,531  9/1926  Jeannin .
4,122,329  10/1978  Godel .................. 34/97 X
4,700,889  10/1987  Lucius et al. ............ 126/110 C

FOREIGN PATENT DOCUMENTS 1076913  10/1958  Fed. Rep. of Germany ......... 34/97
2931936  2/1981  Fed. Rep. of Germany ......... B60H 1/22
7539929  9/1976  France .................. F04D 25/08
7637449  7/1978  France .................. F04D 25/06

Primary Examiner—Henry A. Bennett
Attorney, Agent, or Firm—McGlew and Tuttle

[57] ABSTRACT

A space heater for a motor vehicle contains a burner with a combustion air fan. A series resistor (24) is provided for partial load operation. This resistor (24) is arranged in a housing (2, 6) which surrounds the electric motor (4) driving the fan wheel (14) of the combustion air fan (1) and through which combustion air is passed for cooling the electric motor and the resistor (24). The resistor (24) is soldered to a printed circuit board (20) located radially on the housing, downstream of a combustion air passage opening (22) designed as a cutout in the printed circuit board. The printed circuit board preferably carries a sound-absorbing plate (34) with a cutout (36) in the area of the resistor.

9 Claims, 1 Drawing Sheet

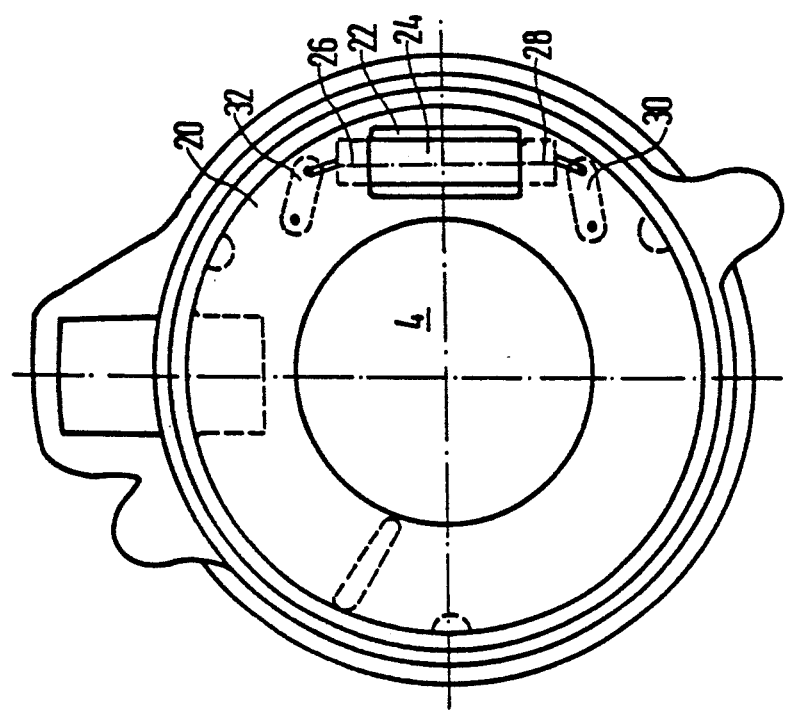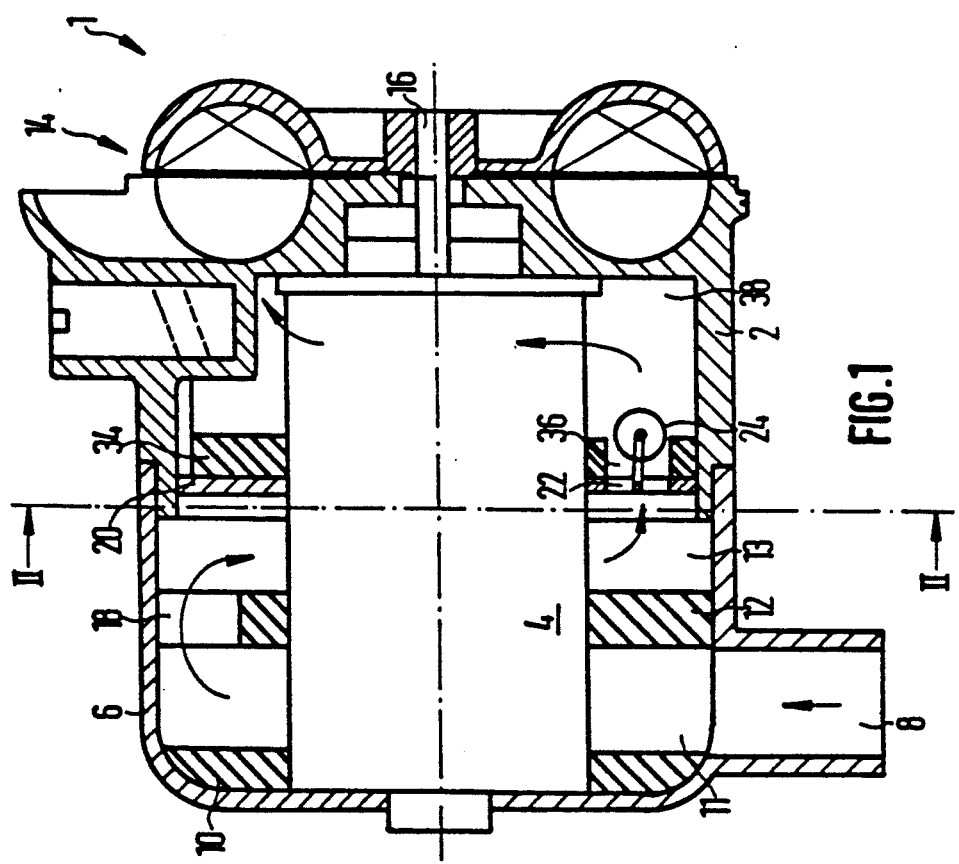

BURNER FOR A MOTOR VEHICLE HEATER

FIELD OF THE INVENTION

The present invention pertains to a burner, e.g., a space heater for a motor vehicle, with a combustion air fan that is driven by an electric motor, and with a device containing an electric resistor for partial load operation.

BACKGROUND OF THE INVENTION

Various embodiments of space heaters for motor vehicles and other mobile units have been known. A distinction is made basically between space heaters using air as the heat carrier and space heaters using water as the heat carrier. Another classification is based on the type of the burner. Practically all types of burners have a combustion air fan.

To control the amount of heat supplied by the operation of the space heater, the burner can be switched on and off at certain time intervals. If the heating capacity required is relatively low, it is more favorable for economic reasons and for reasons of environmental protection to operate the burner in partial load operation only. A series resistor can be inserted into the circuit of the electric motor, so that the electric motor and consequently also the fan wheel will only rotate at reduced speed only.

It has hitherto been common practice to arrange this resistor for the partial load operation in the feed lines leading to the electric motor, outside the housing of the unit. The resistor was exposed there to harmful environmental effects (water, dirt), and even to the risk of possible mechanical damage. It was therefore necessary to protect this resistor.

The electric motor has a considerable electric power consumption even in the case of a space heater for relatively low heating capacity. The difference between the full power and the partial power of the electric motor must be converted by the electric resistor into heat during partial load operation. Therefore, a relatively large resistor with large surface was usually used in order to rapidly remove the heat generated.

It has been known especially in connection with liquid fuel heating devices, especially vehicle space heaters, that an electric motor rotating a fan wheel is optionally operated in full load operation and in partial load operation by means of a series resistor. DE 29,31,936 A1 contains the special suggestion that the glow plug intended for the ignition process, which is arranged in the wall of the burner housing, be used as the series resistor. The glow plug arranged downstream of the burner is arranged in the multiwall housing such that part of the glow plug is located in the heating air stream, another part of the glow plug is located in the waste gas stream, and the tip of the glow plug extends into the burner chamber.

It can be determined from the prior-art FR-PS 2,302,426 that an electric resistor serving to control the speed of an electric motor in an electric fan drive is arranged in a common housing with the driving electric motor and in the air stream of a cooling fan. Such an arrangement is expensive and is not applicable in a vehicle auxiliary heater.

SUMMARY AND OBJECTS OF THE INVENTION

The task of the present invention is to provide a burner for a motor vehicle space heater or the like, in which the electric resistor for the partial load operation is arranged in a protected manner and can be designed as a compact unit.

This task is accomplished according to the present invention by positioning the resistor in the combustion air stream. The electric motor is arranged approximately centrally in an approximately cylindrical housing. A printed circuit board is also installed in the cylindrical housing and radially surrounds the electric motor. A combustion air passage opening is provided in the form of a cutout in the printed circuit board, and the electric resistor is positioned on the downstream side of the passage opening.

The resistor is protected by being arranged in the housing, and since it is cooled by the combustion air stream and because the combustion air guarantees sufficient cooling of the surface of the resistor element, it can be designed as a compact unit. It is particularly advantageous that the combustion air stream is always available when electric energy is converted into thermal energy in the electric resistor. The electric resistor does not need to be cooled after the fan has been switched off.

The combustion air also ensures the cooling of the engine electric motor and especially the cooling of the partial load resistor. These measures also have a favorable effect of bringing about a certain preheating of the combustion air before the combustion air flows into the combustion chamber arranged downstream of the fan wheel.

It is achieved due to the particularly favorable arrangement of the electric resistor that the air flowing through the combustion air passage opening directly reaches one side of the resistor. The resistor usually has an approximately cylindrical shape and is arranged such that the combustion air flows against a half of the cylinder jacket. The air flows past the jacket surface of the resistor element, and the resistor element is cooled intensely. To achieve uniform cooling, the resistor is preferably arranged tangentially in relation to the cylindrical housing.

The electric motor is preferably arranged in an approximately cylindrical housing, and the longitudinal axis, or the motor shaft, of the electric motor approximately coincides with the longitudinal axis of the cylindrical housing. In the case of such a geometric arrangement, the flow path of the combustion air can be readily guided around the electric motor, which usually has its own cylindrical housing.

The present invention specifically provides for the formation of a plurality of annular chambers formed in the cylindrical housing by preferably sound-absorbing, radially extending partitions. At least some of these partitions are provided with openings, through which combustion air flows from a combustion air inlet through the chambers and into a fan wheel. The openings in the partitions are staggered relative to one another over the circumference. Multiple deflections of the combustion air flowing through the housing is thus achieved. The combustion air inlet may be provided at a front-side end of the cylindrical housing, so that the combustion air will flow into a first annular chamber, preferably tangentially. On a side of the annular chamber facing away from the combustion air inlet, there is an axial opening, through which the combustion air enters an adjoining annular chamber. From this chamber the combustion air will enter a succeeding annular chamber via another opening, which is again located on the other side of the housing. The electric motor is cooled intensely due to the frequent axial, radial, and circumferential deflections of the combustion air.

This special arrangement makes possible an especially favorable arrangement of the electric resistor. A printed circuit board is formed which has a combustion air passage opening in the form of a cutout in the printed circuit board. The printed circuit board radially surrounds the electric motor, and is mounted in the cylindrical housing. The electric resistor is preferably arranged on the downstream side of the passage opening. The air flowing through the combustion air passage opening directly reaches one side of the resistor. This resistor usually has an approximately cylindrical shape, and is arranged such that the combustion air flows against half of the cylinder jacket. The air flows past the jacket surface of the resistor element, while the resistor element is cooled intensely. To achieve uniform cooling, the resistor is preferably arranged tangentially in relation to the cylindrical housing.

It would also be possible to arrange the resistor element upstream of the cutout in the printed circuit board, but the cooling effect is not so favorable in this case. Electrically conducting strips are provided on the printed circuit board in the known manner, and the resistor with its two leads is soldered to two conductor strips. Connection to the electrical unit of the device is via the conductor strips.

To achieve the most silent possible operation of the space heater, a sound-absorbing plate, which has a cutout that is essentially congruent with the combustion air passage opening of the printed circuit board, is arranged preferably on the side of the printed circuit board carrying the resistor. Noises of the motor, fan wheel, and the air stream can be extensively absorbed by this sound-absorbing plate and, if desired, additional sound-absorbing plates arranged at spaced locations from one another in the cylindrical housing.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 shows a longitudinal sectional view through a combustion air fan of a space heater, and FIG. 2 shows a side view along line II—II.

DETAILED DESCRIPTION OF THE PREFERRED EMBODIMENT

According to FIG. 1, a combustion air fan, generally designated by the reference numeral 1, contains a mounting housing 2 made of a casting and a housing cap 6, which is placed on the mounting housing 2. As is apparent from FIGS. 1 and 2, the housing parts 2 and 6 are designed as cylindrical parts. An electric motor 4 is arranged centrally in the mounting housing 2.

A motor shaft 16 of the electric motor 4 carries, at its outer end, a fan wheel 14, which cooperates with an annular duct, not shown here, provided in the front side of the mounting housing 2 in order to introduce combustion air into a combustion chamber.

The combustion air flows into the interior of the housing from a combustion air inlet 8 located in the vicinity of the left front side of the housing. A first insulating layer 10, which is in contact with the bottom of the housing cap 6, and a second insulating layer 12 are mounted at spaced locations from one another inside the housing. The two insulating layers 10 and 12 enclose the cylindrical electric motor 4 and form a first annular chamber 11 between them.

On the side of the electric motor 4 facing away from the combustion air inlet 8, an opening 18 is provided in the insulating layer 12. Through the opening 18 the combustion air flows into another annular chamber 13 from the annular chamber 11.

The annular chamber 13 is defined on the right side, as shown in FIG. 1, by a printed circuit board 20. The printed circuit board 20 is designed as an annular printed circuit board and extends between the electric motor 4 and the inside of the mounting housing 2. A sound-absorbing plate 34, which is connected on the right side in FIG. 1, to a third annular chamber 38, is bonded to the side of the printed circuit board 20 facing away from the annular chamber 13.

The combustion air flows through the annular chambers 11, 13, and 38 in the direction of the arrows. The combustion air is then discharged from the fan in the top right part of FIG. 1. The printed circuit board 20 is a printed circuit board commonly used in electrical engineering, made of a nonconducting insulator and a pattern of electrical conductor strips.

On the side opposite the opening 18 of the insulating layer 12 in relation to the electric motor 4, a cutout 22, which forms a combustion air passage opening, is provided in the printed circuit board 20. A corresponding passage opening is formed as a cutout 36 in the sound-absorbing plate 34. As is apparent from the arrows showing the direction of flow, an electric resistor 24, which is the series resistor for the partial load operation of the burner, is located downstream of the printed circuit board cutout 22. Since mainly the mechanical arrangement of the resistor 24 is important here, the electrical connections shall not be discussed here.

As is apparent from the synopsis of FIGS. 1 and 2, the resistor 24, which has a cylindrical shape, is arranged approximately symmetrically to the rectangular cutout 22 of the printed circuit board 20, and the leads 26 and 28 of the resistor 24 are connected to conductor strips 30 and 32, respectively, on the printed circuit board 20 by soldering.

As is apparent from FIG. 1, the middle longitudinal axis of the resistor 24 is approximately in the plane of the free surface of the sound-absorbing plate 34. As a result, the combustion air, arriving from the left in FIG. 1, will flow through the openings 22 and 36, and the flowing air will inherently flow near and past the surface of the resistor due to the reduction of the cross section in the area of the surface of the resistor.

The present invention is not limited to the above-described embodiment. The electric resistor may also be arranged elsewhere in the combustion air housing. It may be arranged radially in relation to the housing. It is also possible to arrange a plurality of individual resistors at different points in the path of the combustion air stream, and this plurality of individual resistor elements will electrically form a partial load resistor.

While specific embodiments of the invention have been shown and described in detail to illustrate the application of the principles of the invention, it will be understood that the invention may be embodied otherwise without departing from such principles.

I claim:

1. A variable burner comprising:
   an air fan;
   motor means, connected to said air fan, and for driving said air fan;
   a substantially cylindrical housing surrounding said motor means and having a center substantially aligned with a center of said motor means;
   a printed circuit board is positioned inside said substantially cylindrical housing and radially surrounding said motor means, said printed circuit board defines an air passage opening; and
   an electrical resistor positioned downstream of said air passage opening.

2. A burner in accordance with claim 1, further comprising:
   a plurality of partitions radially extending between said motor means and said substantially cylindrical housing, said plurality of partitions defining a plurality of annular chambers through which air flows to said air fan, one of said partitions being formed of sound-absorbing material and said partitions defining openings between said plurality of chambers.

3. A burner in accordance with claim 1, further comprising:
   a sound-absorbing plate positioned adjacent said printed circuit board, said sound-absorbing plate defining an air passage opening positioned substantially congruent with said air passage opening of said printed circuit board.

4. A burner in accordance with claim 3, wherein:
   said resistor is positioned on one side of said printed circuit board and said sound-absorbing plate is also positioned on said one side.

5. A variable speed blower comprising:
   a fan;
   a motor means, connected to said fan, and for rotating said fan;
   a housing surrounding said motor means and defining a passage between said motor means and said housing, said passage guiding fluid to said fan;
   a printed circuit board positioned in said passage, said printed circuit board defining an opening, and said opening being part of said passage; and
   a resistor positioned in said opening.

6. A blower in accordance with claim 5, wherein:
   said resistor controls a speed of said motor means and is cooled by said fluid guided through said passage and said opening.

7. A blower in accordance with claim 5, wherein:
   said passage has an inlet in said housing, said inlet being positioned in said housing on an end substantially opposite said fan, said motor means being cooled by said fluid guided in said passage.

8. A blower in accordance with claim 5, wherein:
   said printed circuit board divides said passage into a first chamber and a second chamber, and said opening being an exclusive communication between said first and second chamber.

9. A blower in accordance with claim 5, wherein:
   said housing and said motor means are substantially cylindrical and said opening and said resistor are positioned substantially tangential to said housing to provide substantially even cooling to said resistor.

* * * * *